United States Patent [19]

Rutherford

[11] 4,383,845
[45] May 17, 1983

[54] FOLIAR GROWTH PROMOTING MIXTURE

[76] Inventor: Joseph P. Rutherford, 3203 Rocks Chrome Hill Rd., Jarrettsville, Md. 21084

[21] Appl. No.: 339,758

[22] Filed: Jan. 15, 1982

[51] Int. Cl.³ .............................................. C05F 1/00
[52] U.S. Cl. ......................................... 71/16; 71/23; 71/24
[58] Field of Search ................... 71/1, 6, 9, 11, 15, 71/16, 20, 23, 24, 27, 29, 31; 426/69, 454, 623, 635; 536/3

[56] References Cited

U.S. PATENT DOCUMENTS 4,043,788 8/1977 Fryer ..................................... 71/29
4,125,392 11/1978 Primo ................................. 71/23 X Primary Examiner—Ferris H. Lander
Attorney, Agent, or Firm—Morton J. Rosenberg

[57] ABSTRACT

A foliar growth promoting mixture for increasing crop yield as well as protein content within plants. The foliar growth promoting mixture includes a liquid seaweed base composition which forms approximately 50.0% by weight of the foliar growth promoting mixture. To the liquid seaweed base composition is blended a fish emulsion mixture which forms approximately 25.0% by weight of the overall foliar growth promoting mixture. A liquid humus composition within the approximate weight percentage of between 5.0%–15.0% of the overall mixture is included and a water soluble nutrient from the group consisting of carbohydrates and enzymes within the approximate weight range of 10.0%–20.0% of the foliar growth promoting mixture is further added.

17 Claims, No Drawings

4,383,845

FOLIAR GROWTH PROMOTING MIXTURE

BACKGROUND OF THE INVENTION

1. Field of the Invention

This invention relates to growth promoting mixtures for plant life. In particular, this invention is directed to a foliar growth promoting mixture and method of producing such. More in particular, this invention directs itself to a foliar growth promoting mixture which includes a liquid seaweed base composition for adding auxins, hormones, and enzymes to the plant by absorption through the leaf and stems of the plant life. Still further, this invention directs itself to a foliar growth promoting mixture which includes liquid seaweed for acting as a bio-catalyst to initiate enzymatic reactions. Still further, this invention directs itself to a foliar growth promoting mixture which includes a fish emulsion composition of predetermined weight to provide Nitrogen, Phosphorus, and Potassium to the plant. More in particular, such invention directs itself to a foliar growth promoting mixture wherein the fish emulsion in combination with the liquid seaweed provides for trace elements for absorption by the plant. Additionally, the subject invention directs itself to a foliar growth promoting mixture which includes a liquid humus composition for aiding in supplying nutrients to the plant life. Further, the subject invention includes a water soluble nutrient from the group of carbohydrates and enzymes where such is added in the form of water soluble fractions of complex carbohydrates.

2. Prior Art

Agricultural fertilizers are well-known in the art. Additionally, foliar growth promoting mixtures have also been known in the art. The closest agricultural products known to the Applicant includes U.S. Pat. Nos. 3,377,152; 43,639; 2,158,918; 4,043,788; 1,550,268; 3,940,257; 99,152; 2,992,093; 2,129,334; 3,630,710; 2,317,991; 3,674,649; 2,856,286; and, 4,126,439.

The closest reference in the opinion of Applicant is U.S. Pat. No. 4,043,788. However, in this reference, it is believed that the major proportion of fertilizer is formed of the fish hydrolysate. In this reference, 75.0 parts out of 100.0 parts of the entire composition is formed by using the fish hydrolysate. When a high amount of fish hydrolysate is used, there is a supply to the plant of more of the major nutrients, however, there is obviously less of an input of the trace elements which is found in the major proportion of the subject invention concept where liquid seaweed is being used. The additional liquid seaweed regulates and controls the enzymatic processes and aids during times of plant stress. By using the composition shown in U.S. Pat. No. 4,043,788, there would be a minimal amount of growth during a stress period and as is known, when one counts on the major nutrients, there is a high primary growth, but such is at a very low rate. The use of additional liquid seaweed is believed to act as a catalyst, thereby increasing the amount of Nitrogen, Potassium, and Phosphorus, which is absorbed by the plant through either the soil or the leaf and stem portion.

Reference U.S. Pat. No. 3,377,152 is directed to a phenolics enrichment of humus plant nutrient. It does provide for making plant nutrient from a material containing humic acids by interfacing such with ammonia during an overall process. However, this does not direct itself to the humus and the fish emulsion in combination with the liquid seaweed, as is necessary to get the beneficial effects of the subject invention concept.

Reference U.S. Pat. No. 43,639 is directed to a fertilizer. This reference states that muck is dried and it is believed by the subject Applicant that the muck pertains to wasted fish material. It is believed that this reference only calls for a particular type of fish emulsion, and does not direct itself to the overall system incorporating liquid seaweed, as is necessary to the subject invention concept.

Reference U.S. Pat. No. 2,158,918 uses waste fish for a humus fertilizer. Additionally, this reference calls for peat, bones, lime to be placed in combination with the waste fish products. It is believed that this only calls for approximately 2.0% of the overall system to be formed of the fish products and additionally, does not incorporate liquid seaweed into the overall composition.

Reference U.S. Pat. No. 1,550,268 also uses fish waste for the organically latent nitrogen of the fish substance. However, this does not direct itself to the combination of mixtures for the purposes of increasing the nutrients of the subject invention concept.

SUMMARY OF THE INVENTION

A foliar growth promoting mixture which includes a liquid seaweed base mixture forming approximately 50.0% by weight of the foliar growth promoting mixture. Additionally, a fish emulsion mixture forming approximately 25.0% by weight of the foliar growth promoting mixture is combined with the liquid seaweed base mixture. A liquid humus mixture forming a predetermined weight percentage within the approximate range of 5.0%–15.0% by weight of the overall foliar growth promoting mixture is used. A water soluble nutrient mixture having a predetermined weight percentage within the approximate range of 10.0%–20.0% of the overall foliar growth promoting mixture is combined with the liquid seaweed base mixture, the fish emulsion mixture, and the liquid humus mixture. The soluble nutrient mixture is taken from the group consisting of carbohydrates and enzymes.

DESCRIPTION OF THE PREFERRED EMBODIMENTS

Referring to the invention concept, there is provided a foliar growth promoting mixture to be used as a plant growth regulator for both increasing the yield of plants as well as providing a stimulus for plant growth. As is well-known, plant life may absorb nutrients through the leaves, stems, buds, and flowers, as well as through their roots. However, it has been found that when nutrients are offered to the leaves of plants in soluble forms, only about 5.0% has been wasted and approximately 95.0% is absorbed by the plant for nutrient purposes. In general, when a nutrient is applied to the soil, only approximately 10.0% is absorbed by the plant for nutrient purposes.

Thus, in many cases, foliar applied growth promoting systems and nutrients have been found to be substantially more effective than soil applied fertilizers.

In overall concept, the subject foliar growth promoting mixture develops a system that is used primarily as a foliar spray and delivers both the major and minor nutrients in solution to be absorbed through the leaves and stems of the plant in order to promote efficient growth of the plant. The foliar mixture as herein described provides for an improved foliar spraying system which may be produced in a commercially viable manner to present plants with absorbable nutrients through the leaves, thus bypassing insertion into the soil of the nutrients. Additionally, foliar growth promoting mixtures have advantages such as directly inserting salts of some elements which are essential to plant nutrition which may be found difficult to pass from the soil and enter the roots of a plant. In particular, phosphorus is a salt which shows reluctance to pass through the soil into the roots, whereas such salt is easily absorbed by the leaves of the plant during a foliar spraying. Additionally, foliar spraying may act as a tonic to allow plants to increase their intake of nutrients from the soil than they would otherwise do if the foliar spraying were not provided.

The subject foliar growth promoting mixtures includes four base composition mixtures blended together in predetermined weight and volume percentages, to be described in following paragraphs. Each of the base composition mixtures are prepared separately and will be described in the following disclosure.

The overall foliar growth promoting mixture initially includes a liquid seaweed base mixture forming approximately 50.0% by weight of the total foliar growth promoting mixture. To this is added a fish emulsion mixture which forms approximately 25.0% by weight of the total foliar growth promoting mixture. Further, a liquid humus mixture forming a predetermined weight percentage within the approximate range of 5.0%–15.0% by weight of the total foliar growth promoting mixture is blended with the liquid seaweed base mixture and the fish emulsion mixture. Finally, a water soluble nutrient mixture having a predetermined weight percentage within the approximate range of 10.0%–20.0% of the total foliar growth promoting mixture is added to the blend of liquid seaweed base mixture, fish emulsion mixture, and liquid humus mixture. The soluble nutrient mixture is taken from the group consisting of carbohydrates and enzymes.

Initially, a commercially dehydrated seaweed base is provided. One such type of seaweed which is purchased in dehydrated form is commercially available from Maxicrop Corporation of Chicago, Illinois. Tap water is added to the dehydrated seaweed in order to re-hydrate such for forming an appropriate seaweed/water mixture. In the following paragraphs, all weight percentages are directed to the weight and volume included for the formation of 1.0 gallons of liquid seaweed.

In the formation of the liquid seaweed base mixture, as herein defined, approximately 10.7 ounces of dehydrated seaweed powder is added to approximately 1.0 gallons of tap water. The dehydrated seaweed powder is inserted into the water and is blended therewith either manually or in a mechanical manner. The method of blending the dehydrated seaweed powder is not important to the inventive concept as herein described, with the exception that the blending process should provide dispersed and generally homogeneous mixture of seaweed powder within the water base mixture.

The liquid seaweed base mixture as provided in the instant composition provides for substantially all of the known elements essential to the growth of plants, as well as providing auxins, hormones and enzymes. Additionally, the liquid seaweed base mixture also is used in the overall foliar growth promoting mixture as a biocatalyst which initiates enzymatic processes.

The trace elements form part of the enzymes which initiate and control vital processes of plant growth. Enzymes generally contain inorganic components and the complex molecule of enzymes containing carbon, oxygen, hydrogen and nitrogen atoms may only contain one atom of a trace element metal. However, without that one atom of metal in the molecules, the enzyme would be unable to function in its prescribed manner and aid the growth of the plant.

In general, trace elements may not be provided in the soil, or in the alternative, a particular trace element may be inherent within the soil but unavailable for use by the plants. In actual practice, various substances in the soil may deny one trace element to the plants even if the trace element is in the soil in sufficient quantities for passage to the plant. In one particular example, soils which contain lime have been found to be Manganese deficient, although Manganese is present in the soil. Once Manganese deficiency is found, shortage of trace elements of Cobalt, Copper, Iron and Zinc have also been seen. Such elements form insoluble phosphates in soil containing lime and the insoluble phosphates are not readily absorbed by the plants. Additionally, Iron may also be fixed by Calcium Carbonate and in the presence of Calcium Carbonate in the soil, there has been found to be Iron deficiencies in the plants.

Trace elements in small quantities absorbed by plants become the core atom of numerous enzyme systems which control both the photosynthesis, the respiration, as well as the flowering and fruiting of plants. The minerals are chelated due to the fact that the trace minerals form an organic bond in the original solution and thus, such are chelated naturally and are readily absorbed by the plants through foliar feeding.

Trace elements thus are an important consideration of the overall foliar growth promoting mixture as is herein defined. The Norwegian Institute of Seaweed Research has provided a detailed analysis of Ascophyllum Nodoeum showing the breakdown of elements found therein. The following Table shows a weight percentage analysis of elements which aids in the high yield rate of the subject foliar growth promoting mixture:

TABLE I

ELEMENTS FOUND IN SEAWEED - % BY WEIGHT

| | % | | % |
|---|---|---|---|
| Silver | .000004 | Nitrogen | .062400 |
| Aluminum | .193000 | Sodium | 4.180000 |
| Gold | .000006 | Nickel | .003500 |
| Boron | .019400 | Oxygen | Undeclared |
| Barium | .001276 | Oxmium | Trace |
| Carbon | Undeclared | Phosphorus | .211000 |
| Calcium | 1.904000 | Lead | .000014 |
| Chlorine | 3.680000 | Rubidium | .000005 |
| Cobalt | .001227 | Sulphur | 1.564200 |
| Copper | .000635 | Antimony | .000142 |
| Fluorine | .032650 | Silicon | .164200 |
| Iron | .089560 | Tin | .000006 |
| Germanium | .000005 | Strontium | .074876 |
| Hydrogen | Undeclared | Tellurium | Trace |
| Mercury | .000190 | Titanium | .000012 |
| Iodine | .062400 | Thallium | .000293 |
| Potassium | 1.280000 | Vanadium | .000531 |
| Lanthanum | .000019 | Tungsten | .000033 |
| Lithium | .000007 | Zinc | .003516 |
| Magnesium | .213000 | Zirconium | .000001 |
| Manganese | .123500 | Selenium | .000043 |
| Molybdenum | .001592 | Uranium | .000004 |

The foliar growth promoting mixture further includes a fish emulsion mixture which forms approximately 25.0% by weight of the overall or total foliar growth promoting mixture. In general, approximately 1.0 quart of liquid fish emulsion mixture is used per 1.0 gallon of total foliar growth promoting mixture. Dehydrated fish emulsion is commercially available and two sources include the Atlas Fish Fertilizer Company in Washington, and Ortho Corporation in Virginia, which generally provide an analysis of 5.0 parts of Nitrogen to 1.0 part of Phosphorus and 1.0 part of Potassium.

The liquid fish emulsion mixture, as provided in the subject concept, generally is a water soluble mixture of Nitrogen, Phosphorus and Potash and not only supplies the major nutrients, but also contains significant amounts of trace minerals. Much of the Nitrogen in the fish emulsion is present in the form of Amino Acids from the breakdown of the protein in the processing stage. The Amino Acids, as will be described in following paragraphs, may easily be absorbed by the leaves or roots of plants.

In general, the steps of providing or establishing a fish emulsion mixture includes the steps of inserting fish solids into a pressure vessel and introducing an alkaline composition into the vessel. The alkaline composition used in the subject invention concept is Calcium Carbonate, and the fish solids and alkaline composition are maintained at a steam pressure of approximately 300 PSIA for a predetermined time interval within the pressure vessel. The fish emulsion liquid mixture suitable for blending with the remaining compositions in the subject foliar growth promoting mixture. The process of hydrolysis breaks down the solid matter and complex proteins into simpler compounds such as the amino acids. The amino acids provided in the overall foliar growth promoting mixture will be presented in following Tables subsequent to a discussion of the remaining mixture forming the total foliar growth promoting mixture.

The amount of time that the fish solids and alkaline composition are maintained within the pressure vessel is determinate on the overall weight and relative weight percentages of the fish solids and alkaline composition. In one batch of fish solids and alkaline composition, the relative weight breakdown was approximately 10.0 parts of fish solids to approximately 1.0 parts of Calcium Carbonate. In this case, it was found that the fish emulsion mixture was substantially hydrolyzed within 1.0 hours.

In addition to both the liquid seaweed base mixture and the fish emulsion mixture, as previously described, there is further included a liquid humus mixture forming a predetermined weight percentage within the approximate range of 5.0%–15.0% by weight of the foliar growth promoting mixture. The liquid humus mixture includes a combination of peat humus and an aqueous solution of ammonia. The liquid humus mixture is an extract of diluted ammonia combined with peat humus. The diluted ammonia solution extracts humic acids out of the peat humus and the resulting mixture is a blend of humic acids.

An aqueous solution of ammonia is combined with the peat humus and the peat humus is washed with the aqueous ammonia solution. The ratio of peat humus to aqueous ammonia solution is by weight 1.0 part of peat humus to 6.0 parts of ammonia.

In particular, 0.025 cups of peat humus commercially purchased is mixed with 1,000 milliliters of tap water. The peat humus and water composition is blended together or agitated for approximately 5.0 minutes in a standard laboratory agitator. The mixture becomes dark and viscous in nature.

Aqueous ammonia solution is then added to the peat humus and water composition in the amount of approximately 1.5 cups of aqueous ammonia solution. The entire mixture is then agitated once again for approximately 5.0 minutes and the combination is allowed to develop or set for approximately 24 hours. The resulting mixture after the 24 hour period is a black viscous mixture containing humic acid.

The humic acid content performs a plurality of functions when introduced to the plant as a foliar feeder. In particular, the humic acid has the property of chelating minerals in the soil and in the plant itself. As an example, where Iron Sulfate was introduced to the soil or to the plant, such would generally not be available to the plant due to the fact that there is a high pH value of the soil and the plant itself will have a high pH. Calcium Carbonate which may be present gives the high pH in the soil and tends to lock out the Sulfates and not allow such to become available to the plant for nutrient purposes. The humic acid has the ability to chelate the mineral and make it available to the plant not only through the soil but also through foliar feeding. Additionally, the humates or humic acid addition to the plant allows release of minerals unavailable to the plant due to the chelating ability of the humic acid itself.

Finally, a water soluble nutrient mixture having a predetermined weight percentage within the approximate range of 10.0%–20.0% of the total foliar growth promoting mixture is combined with the liquid seaweed base mixture, the fish emulsion mixture, and the liquid humus mixture. The water soluble nutrient mixture is taken from the group consisting of both Carbohydrates and Enzymes.

The soluble nutrient mixture includes an approximate weight percentage of 4.68% Mannose; 3.12% Proteinase; 1.56% Maltase; 1.56% Cellulase; 0.0156% Protease; 15.613% Amylase; 7.81% Lipase; 0.156% Peroxygenase; and, 0.0156% Phenylogenase. These enzymes are provided in the water soluble nutrient mixture and in the overall total foliar growth promoting mixture have been analyzed to provide the following approximate weight percentages, as detailed in following Table II:

TABLE II
ENZYMES

| | |
|---|---|
| Mannose | 3.0 grams |
| Proteinase | 2.0 grams |
| Maltase | 1.0 grams |
| Cellulase | 1.0 grams |
| Protease | 10.0 milligrams |
| Amylase | 10.0 grams |
| Lipase | 5.0 grams |
| Peroxygenase | 10.0 milligrams |
| Phenyloxgenase | 10.0 milligrams |

Additionally, the water soluble nutrient includes carbohydrates in an approximate weight percentage of 3.122% Maltose, 15.61% Dextrose; 4.7% Beef Extract; 0.00468% Sorbital; 18.74% Mannitol; 0.00468% Peptone; 18.74% Cellobiose; 0.0156% Cellulose; 0.0078% Xylose; and 7.18% Yeast Extract. The carbohydrates when taken with respect to the overall foliar growth promoting mixture are shown in the following Table III in their approximate weights:

TABLE III
CARBOHYDRATES

| | |
|---|---|
| Maltose | 2.0 grams |
| Dextrose | 10.0 grams |
| Beef Extract | 3.0 grams |

TABLE III-continued

| CARBOHYDRATES | |
|---|---|
| Sorbitol | 3.0 milligrams |
| Mannitol | 12.0 grams |
| Peptone | 10.0 grams |
| Cellobiose | 2.0 milligrams |
| Cellulose | 10.0 milligrams |
| Xylose | 5.0 milligrams |
| Yeast Extract | 5.0 grams |

Finally, vitamins are added to the overall foliar growth promoting mixture to provide a vitamin mixture per one gallon of foliar growth promoting mixture in the amount approximating: 800 milligrams Vitamin C; 800 milligrams Vitamin A; 5.0 grams from the group consisting of Vitamins $B_1$, $B_2$, and $B_{12}$; 10.0 milligrams Pantothenic Acid; 500.0 milligrams Folic Acid; 0.5 milligrams of Folinic Acid; 1.0 milligrams of Vitamin K; and, 100.0 I.U. Vitamin E. The vitamin mixture added to the overall foliar growth promoting mixture is shown in Table IV:

TABLE IV

| VITAMINS | |
|---|---|
| Vitamin C | 800.0 milligrams |
| Vitamin A | 800.0 milligrams |
| Vitamin B Group | 5.0 grams |
| Pantothenic Acid | 10.0 milligrams |
| Folic Acid | 500.0 milligrams |
| Folinic Acid | 0.5 milligrams |
| Vitamin E | 100 I.U. |
| Vitamin K | 1.0 milligrams |

The fish emulsion mixture provided a plurality of amino acids as shown in Table V as follows:

TABLE V

| AMINO ACIDS | |
|---|---|
| Casamino Acid | 5.0 grams |
| Soytone | 5.0 grams |
| Proteouse Peptone | 3.0 grams |
| Tryptone | 10.0 grams |

The liquid seaweed base mixture, fish emulsion mixture, liquid humus mixture, water soluble nutrient mixture, and additional vitamin mixtures were blended together in a vessel to provide the final foliar growth promoting mixture, as hereinbefore described.

Experimental results using the subject foliar promoting mixture were run at the University of Maryland where both a crop yield test and an accrued protein content test were run. A control plot was provided and the plant being used was soybean. The control plot yielded 36.0 bushels per acre and no additional nutrients were added to the soil. In the test plots, the only extra nutrient was the subject foliar growth promoting mixture. The yield per acre using the subject foliar growth promoting mixture was 41.0 bushels per acre which provided a yield increase of approximately 15.0% over the control plot.

The control plot protein content was approximately 17.0% and through utilization of the subject foliar growth promoting mixture, the protein content in the soybean plants was found to be approximately 18.2%, which represented a 1.2% increase in the protein content of the plants using the subject foliar growth promoting mixture.

The foliar growth promoting mixture as herein provided unexpectedly provides for a high nitrogen content. The foliar growth promoting mixture of the subject invention was prepared for text analyzation by a private Corporation to determine various components. The test evaluation mixture was prepared in the following weight percentage values: 50.0% seaweed; 10.0% carbohydrates and enzymes; 25.0% fish emulsion; and, 15.0% liquid humus. The foliar growth promoting mixture was prepared in the same manner as has hereinbefore been detailed. The pH of the resulting foliar growth promoting mixture was approximately 6.5 without any adjustment. As is well-known, the preferred range for growth promoting mixtures of this type is between 6.0 and 7.0 pH for maximum absorbancy by the plant.

The above mixture was chemically analyzed and found to provide by weight percentage: 0.36% total phosphoric acid; 0.03% insoluble phosphoric acid; 0.33% available phosphoric acid; 1.63% nitrogen; and, 0.55% potash. The percent of 1.63 of available nitrogen is substantially more than expected for an organic property, and enhances the growth of plants to a great degree, since nitrogen is one of the most widely used nutrients for growth and photosynthesis.

A number of further crop tests were run using the foliar growth promoting mixture as defined in the previous paragraphs, with the same basic composition. The following paragraphs direct themselves to such additional test runs.

A 1.0 acre plot size was planted with corn of the strain of Dekalb Hybrid. The seeding rate was 25.0 pounds per acre and the date planted was May 14, 1981, with the date harvested being Oct. 27, 1981. A control plot of 1.0 acre was used where no foliar growth promoting mixture was added, and a secondary plot using the foliar growth promoting mixture was compared there against. In the first run sample, the control plot size of 1.0 acre produced 64.1 bushels of corn, where the test plot using the foliar growth promoting mixture produced 81.3 bushels for a net increase of 26.8 bushels, or an increased percentage of 32.9% in the yield. With this same crop, another run was made using both a control and test plot size of 1.0 acre with the planting and harvesting dates identical to that previously described. In this secondary test, the control plot produced 59.8 bushels of corn and the test plot produced 74.2 bushels of corn, for a total yield increase of 24.0 bushels when the foliar growth promoting mixture was used. The use of the foliar growth promoting mixture thus percentage-wise increased the yield by approximately 32.3%.

In another experimental run, alfalfa crop was planted having a strain of Scout with a seeding rate of 20.0 pounds per acre. The data of planting was May 2, 1981, and the date harvested was Aug. 15, 1981. Each plot size for the control group and the test group was 1.0 acres. In this run, the main consideration was protein content of the control plot vs. the test plot using the foliar growth promoting mixture. Analysis of the harvested plants showed that in a first run, the control plot contained 15.1% protein, whereas the test plot plants produced 16.4% protein. This increase in protein content represented a net increase of 8.60% for the plants which were treated with the foliar growth promoting mixture. In a second run, the control plot alfalfa showed a protein content of 15.9%, whereas the test plants provided a 17.1% protein content, representing a 7.54% protein increase.

Additionally, a crop of soybeans having a strain known as Williams was planted on 30 May 1981 and harvested on 18 October 1981. The seeding rate for all control and test plots of 1.0 acre was 1.0 bushels per acre. In this run, a control plot of 1.0 acre produced 33 bushels, whereas the test plot produced 39 bushels for an increase of 6.0 bushels per acre, or a percent increase of approximately 18.1%. In a second run, the control plot not using the foliar growth promoting mixture produced 36.0 bushels of soybeans, and the test plot of 1.0 acre produced 41.0 bushels, for an increase of 5.0 bushels when the foliar growth promoting mixture was used, which represented an approximate percent increase in the yield of 13.8%.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A foliar growth promoting mixture, including:
   (a) a liquid seaweed base mixture forming approximately 50.0% by weight of said foliar growth promoting mixture;
   (b) a fish emulsion mixture forming approximately 25.0% by weight of said foliar growth promoting mixture;
   (c) a liquid humus mixture forming a predetermined weight percentage within the approximate range of 5.0%-15.0% by weight of the said foliar growth promoting mixture, said liquid humus mixture being a combination of peat humus and aqueous solution of ammonia; and,
   (d) a water soluble nutrient mixture having a predetermined weight percentage within the approximate range of 10.0%-20.0% of said foliar growth promoting mixture, said soluble nutrient mixture from the group consisting of carbohydrates and enzymes.

2. The foliar growth promoting mixture as recited in claim 1 where said fish emulsion mixture is hydrolyzed.

3. The foliar growth promoting mixture as recited in claim 2 wherein said fish emulsion mixture includes a weight percentage when taken each with respect to the other of approximately 5.0 parts Nitrogen: 1.0 parts Phosphorus: 1.0 parts Potassium.

4. The foliar growth promoting mixture as recited in claim 1 where said soluble nutrient mixture includes an approximate weight percentage of 4.68% Mannose; 3.12% Proteinase; 1.56% Maltase; 1.56% Cellulase; 0.0156% Protease; 15.613% Amylase; 7.81% Lipase; 0.0156% Peroxygenase; and, 0.0156% Phenylorgenase.

5. The foliar growth promoting mixture as recited in claim 4 where said soluble nutrient mixture includes an approximate weight percentage of 3.122% Maltose; 15.61% Dextrose; 4.7% Beef Extract; 0.00468% Sorbitol, 18.74% Mannitol; 15.613% Peptone; 0.003% Cellobiose; 0.0156% Cellulose; 0.0078% Xylose, and, 7.81% Yeast Extract.

6. The foliar growth promoting mixture as recited in claim 1 including per gallon of said foliar growth promoting mixture a vitamin mixture including approximately 800 milligrams Vitamin C; 800 milligrams Vitamin A; 5.0 grams from the group consisting of Vitamins $B_1$, $B_2$, and $B_{12}$; 10.0 milligrams Pantothenic Acid; 500.0 milligrams Folic Acid; 0.5 milligrams Folinic Acid; 1.0 milligrams Vitamin K. and 100 I.U. Vitamin E.

7. The foliar growth promoting mixture as recited in claim 1 where said fish emulsion mixture includes amino acids from the group consisting of Casomino Acid, Soytone, Proteouse Peptone, and Tryptone.

8. The foliar growth promoting mixture as recited in claim 7 where said amino acids include a weight percentage each to the other approximating 21.0% Casamino Acid; 21.0% Soytone; 16.0% Proteouse Peptone; and, 42.0% Tryptone.

9. A method of producing a foliar growth promoting mixture, including the steps of:
   (a) providing a liquid seaweed base mixture forming approximately 50.0% by weight of said growth promoting mixture;
   (b) establishing a fish emulsion mixture being approximately 25.0% by weight of said growth promoting mixture;
   (c) forming a liquid humus mixture being approximately within the range of 5.0%-15.0% by weight of said growth promoting mixture, said liquid humus forming including combining peat humus with water to form an intermediate liquid humus mixture in the approximate proportion of 2.0 ounces of peat humus to 1000.0 ml. of water and agitating said intermediate liquid humus mixture for a predetermined time interval until said peat humus is dispersed in said water;
   (d) providing a water soluble nutrient mixture being approximately within the range of 10.0%-20.0% of said growth promoting mixture, said water soluble mixture from the group consisting of carbohydrates and enzymes; and,
   (e) blending said liquid seaweed base mixture, said fish emulsion mixture, said liquid humus mixture and said water soluble nutrient mixture.

10. The method of producing a foliar growth promoting mixture as recited in claim 9 where the step of providing said liquid seaweed base mixture includes the step of combining approximately 10.7 ounces of dehydrated seaweed powder with approximately 1.0 gallons of water.

11. The method of producing a foliar growth promoting mixture as recited in claim 10 followed by the step of blending said dehydrated seaweed with said water.

12. The method of producing a foliar growth promoting mixture as recited in claim 9 where the step of agitating is followed by the step of adding in proportion to said peat humus and water approximately 12.0 ounces of an aqueous ammonia solution.

13. The method of producing a foliar growth promoting mixture as recited in claim 12 where the step of adding said aqueous ammonia solution is followed by the step of further agitating said intermediate liquid humus mixture and said aqueous ammonia solution for a predetermined time interval.

14. The method of producing a foliar growth promoting mixture as recited in claim 13 where the step of further agitating is followed by the step of stabilizing said agitated intermediate liquid humus mixture and said aqueous ammonia solution to form said liquid humus mixture.

15. The method of producing a foliar growth promoting mixture as recited in claim 9 where the step of establishing a fish emulsion mixture includes the steps of:

(a) inserting fish solids into a pressure vessel;

(b) introducing an alkaline composition into said vessel; and, (c) maintaining said fish solids and alkaline composition at a steam pressure approximating 300 psia for a predetermined time interval.

16. The method of producing a foliar growth promoting mixture as recited in claim 15 where said alkaline composition is Calcium Carbonate.

17. The method of producing a foliar growth promoting mixture as recited in claim 16 including the step of hydrolyzing said fish solids and Calcium Carbonate in said pressure vessel.

* * * * *